May 11, 1965 B. J. ROSS 3,183,368

MULTIVIBRATOR CIRCUIT WITH INPUT SIGNAL SYNCHRONIZED MEANS

Filed July 3, 1961 2 Sheets-Sheet 1

INVENTOR
B. JAMES ROSS

BY Bernard M. Weiner

ATTORNEY

May 11, 1965 B. J. ROSS 3,183,368

MULTIVIBRATOR CIRCUIT WITH INPUT SIGNAL SYNCHRONIZED MEANS

Filed July 3, 1961 2 Sheets-Sheet 2

United States Patent Office 3,183,368

Patented May 11, 1965

3,183,368

MULTIVIBRATOR CIRCUIT WITH INPUT SIGNAL SYNCHRONIZED MEANS

Bernard James Ross, Owego, N.Y., assignor to International Business Machines Corporation, New York, N.Y., a corporation of New York Filed July 3, 1961, Ser. No. 121,718

1 Claim. (Cl. 307—88.5)

This invention relates to signal synchronized pulse train producing apparatus and more particularly to signal synchronized pulse train producing multivibrators.

A signal synchronized pulse train producing apparatus provides a pulse train related in time to a signal train. The timing characteristics of the pulses are related according to a pattern established by sequential synchronizing signals applied to the apparatus. The timing characteristic of a pulse includes both the pulse width and time relationship of the pulse to an established time-datum. A pulse train producing multivibrator has two current conductable operative sections and respective current conduction controls therefor. Each operative section is quasi-stable alternately in one of two current conduction states. An astable multivibrator provides a pulse train whose timing characteristic is determined by internal circuit parameters. A monostable multivibrator provides a pulse train whose timing characteristic is determined both by sequential synchronizing signals applied thereto and internal circuit parameters.

Heretofore, extensive and complex additional circuitry has usually been required to obtain flexible control of the timing characteristic of the pulse train from a pulse train producing apparatus.

It is desirable in an electronic logic circuit to provide a pulse train having a particular timing characteristic relative to a plurality of sequential signals. Generally, for a pulse train producing multivibrator, it is desirable to provide flexible control of the pulse train timing characteristic. For a pulse train producing astable multivibrator it is important that equally spaced synchronizing signals cause the pulses of the pulse train to be in fixed timing relationship thereto. For a pulse train producing monostable multivibrator it is important that the timing characteristics of the pulses be a function of random synchronizing signals.

It is the prime object of this invention to provide a signal synchronized pulse train producing apparatus.

It is another object of this invention to provide a signal synchronized pulse train producing astable multivibrator.

It is still another object of this invention to provide a signal synchronized pulse train producing monostable multivibrator.

It is a further object of this invention to provide apparatus for defining an isolated time interval between first and second signals.

It is still a further object of this invention to provide apparatus for defining a time interval subsequent to a signal.

The foregoing and other objects, features and advantages of the invention will be apparent from the following more particular description of preferred embodiments of the invention, as illustrated in the accompanying drawings.

Generally, this invention provides signal synchronized pulse train producing apparatus. Through a current switching means the timing characteristic of the pulse train is flexibly controlled. The control is obtained by connecting the current switching means to a relaxation-time circuit which determines the timing characteristic of the apparatus. The relaxation-time circuit is reset to its metastable condition by each signal.

Particularly, this invention provides control means for establishing the timing characteristic of a pulse train producing multivibrator by use of a plurality of synchronizing signals, each of which resets the timing network thereof.

A feature of this invention is a uniformly synchronized pulse train producing astable multivibrator having first and second transistors and a synchronizing switching transistor. The synchronizing transistor is coupled to an RC timing network associated with one of the transistors. Each synchronizing signal applied to the synchronizing transistor resets the RC timing network, thereby causing the astable multivibrator to time the subsequent pulses of the pulse train in a pre-established relationship to the signal train.

Another feature of this invention is a randomly synchronized monostable multivibrator. The monostable multivibrator has a first and second transistor. A random synchronizing signal causes a synchronizing transistor to reset the RC timing network of one of the transistors thereby causing the next pulse produced by the monostable multivibrator to continue in duration after the signal for an interval determined by the relaxation-time of the RC timing network.

Figure 1:
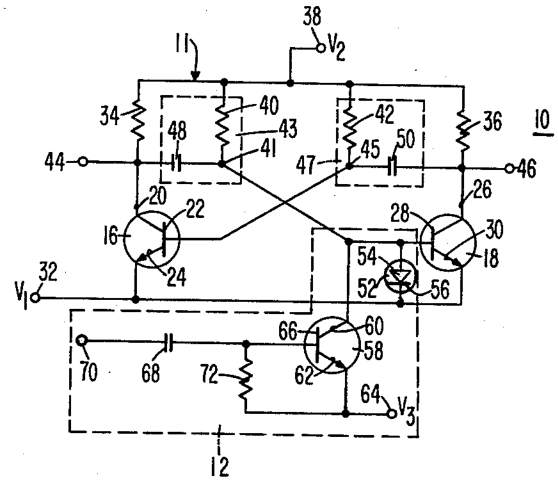
FIGURE 1 is an illustrative embodiment of a signal synchronized astable multivibrator in accordance with this invention.

FIG. 1 illustrates a signal synchronized astable multivibrator 10 in accordance with this invention. It comprises a conventional astable multivibrator portion 11 and a synchronizing means 12. Signal synchronized astable multivibrator 10 includes transistors 16 and 18. Transistor 16 has collector 20, base 22 and emitter 24; transistor 18 has collector 26, base 28 and emitter 30. Emitters 24 and 30 are commonly connected to negative voltage source $V_1$ at terminal 32. Collectors 20 and 26 are connected via resistors 34 and 36, respectively, to voltage source $V_2$ at terminal 38. Terminal 38 is connected via resistor 40 to base 28 of transistor 18 and via resistor 42 to base 22 of transistor 16. Signal synchronized astable multivibrator 10 has output terminals 44 and 46 connected, respectively, to collectors 20 and 26. Capacitor 48 is connected between collector 20 of transistor 16 and base 28 of transistor 18, and capacitor 50 is connected between collector 26 of transistor 18 and base 22 of transistor 16. Resistor 40 is connected to capacitor 48 at junction 41 and forms therewith an RC timing network 43 for timing transistor 18. Resistor 42 is connected to capacitor 50 at junction 45 and forms therewith RC timing network 47 for timing transistor 16.

Figure 4:
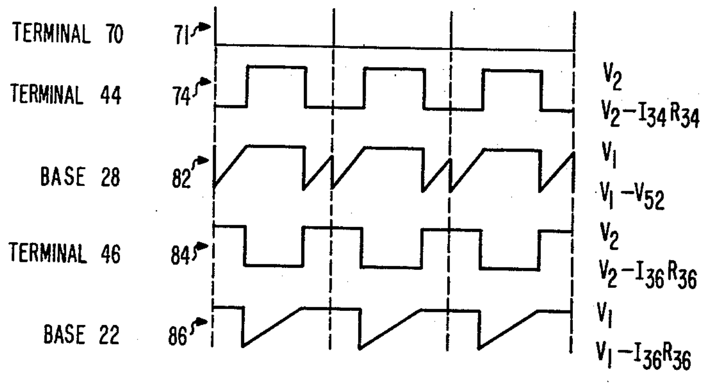
FIGURE 4 is an illustrative timing chart showing potential levels at particular points in the astable multivibrator of FIG. 1 during its operation.

Signal synchronizing means 12 includes Zener diode 52 with its anode 54 connected to base 28 of transistor 18 and its cathode 56 connected to emitter 30 of transistor 18. It also includes transistor 58 with its collector 60 connected to capacitor 48 and its emitter 62 connected to source of negative potential $V_3$ at terminal 64. The base 6 of transistor 58 is connected via capacitor 68 to input terminal 70 to which are applied equally spaced synchronizing signals 71 (FIG. 4). Base 66 of transistor 58 is connected to voltage source $V_3$ at terminal 64 via resistor 72. The voltage sources $V_1$, $V_2$ and $V_3$ are such that their voltage levels relative to a voltage datum is $V_2>V_1>V_3$.

Figure 2:
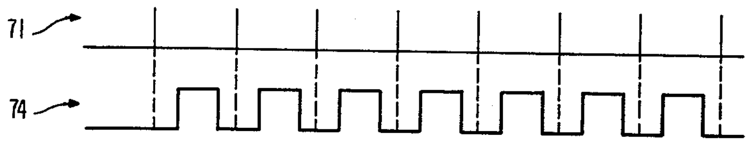
FIGURE 2 illustrates the timing characteristic of the pulse train from the astable multivibrator of FIG. 1 relative to equally spaced synchronizing signals.
Figure 3:
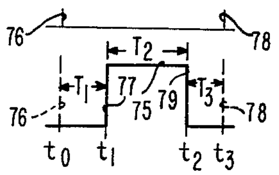
FIGURE 3 represents the detailed relationship of the timing characteristic of a particular pulse from the astable multivibrator of FIG. 1 relative to the immediately preceding signal and the immediately following signal.

The time relationship of several voltage levels for signal synchronized astable multivibrator 10 will be understood by consideration of FIGS. 2, 3 and 4. With reference to FIG. 2, synchronizing signals 71 at 70 are shown in time relationship to the pulses of pulse train 74 at terminal 44. The time relationship of an illustrative pulse 75 to an immediately preceding signal 76 and an immediately following signal 78 is shown in FIG. 3.

Synchronizing signal 76 is introduced to terminal 70 at time $t_0$. The leading edge 77 of pulse 75 appears at output terminal 44 at time $t_0+T_1$ and the lagging edge 79 thereof appears at output terminal 44 at time $t_0+T_1+T_2$. The next synchronizing signal 78 is introduced to terminal 70 at time $t_0+T$ where $T=T_1+T_2+T_3$. Thus, $T_1$=time spacing between $t_0$ and $t_1$, $T_2$=time spacing between $t_1$ and $t_2$, and $T_3$=time spacing between $t_2$ and $t_3$. For the time relationship shown in FIGS. 2 to 4, the restriction $T_1>T_3$ applies where pulse 75 is isolated between signals 76 and 78. Curve 82 represents the voltage levels at base 28 of transistor 18. Curve 84 represents the pulse train which appears at terminal 46. Curve 86 represents the voltage level which appears at base 22 of transistor 16. The current through resistor 34 is termed $I_{34}$. The current through resistor 36 is termed $I_{36}$. The voltage levels of positive going pulse train 74 lie between $(V_2-I_{34}R_{34})$ and $V_2$. The positive going voltage levels of curve 82 lie between $(V_1-V_{52})$ and $V_1$, neglecting transistor junction drops. $V_{52}$ is the characteristic breakdown voltage of Zener diode 52. The voltage levels of the negative going pulse train 84 lie between $(V_2-I_{36}R_{36})$ and $V_2$. The voltage levels of curve 86 lie between $(V_1-I_{36}R_{36})$ and $V_1$, neglecting transistor junction drops.

The operation of the signal synchronized astable multivibrator 10 illustrated in FIG. 1 is as follows:

Transistor 58 performs the function of a signal operated switch through which capacitor 48 is discharged. The Zener diode 52 characteristic breakdown voltage $V_{52}$ across its terminals sets the down level voltage of base 28 of transistor 18 thereby preventing transistor 58 from saturating and also provides a reference voltage for the resistor 40 and capacitor 48 of RC timing network 43. The Zener diode 52 can be replaced by conventional circuitry which performs these functions. At time $t_0$, a synchronizing signal 76 turns transistor 58 ON thereby discharging capacitor 48 to voltage $(V_1-V_{52})$. This discharge turns transistor 18 OFF and turns transistor 16 ON. At the termination of the synchronizing signal 76, transistor 58 turns OFF and capacitor 48 starts charging toward voltage $V_2$ through resistor 40. At time $t=t_1$, capacitor 48 has charged sufficiently to bring the base 28 potential of transistor 18 above $V_1$ and transistor 18 starts to conduct. As transistor 18 turns ON, transistor 16 turns OFF, and capacitor 50 charges toward voltage $V_2$ through resistor 42.

At time $t=T_1+T_2$ capacitor 50 has charged sufficiently to turn transistor 16 ON again. The collector 20 potential is transmitted to the base 28 of transistor 18 through capacitor 48 and the Zener diode 52 conducts thereby biasing the base 28 of transistor 18 at $(V_1-V_{52})$ voltage. Thereafter, capacitor 48 starts charging toward voltage $V_2$. However, before capacitor 48 has reached a voltage level sufficient to turn transistor 18 ON, the next synchronizing signal causes transistor 58 to conduct at time $t=T_1+T_2+T_3$. Thereafter, capacitor 48 discharges to a voltage level $(V_1-V_{52})$ thereby holding transistor 18 OFF. The timing cycle repeats for each synchronizing signal. As a result, pulse trains 74 and 84 appear at output terminals 44 and 46, respectively. The pulses thereof have a time spacing $T_2$ and are delayed from the last synchronizing signal by time spacing $T_1$. The timing relationship between various voltage levels dictates that $T_1$ be greater than $T_3$ for an isolated pulse 75 between an immediately preceding signal 76 and the immediately following signal 78.

Figure 5:
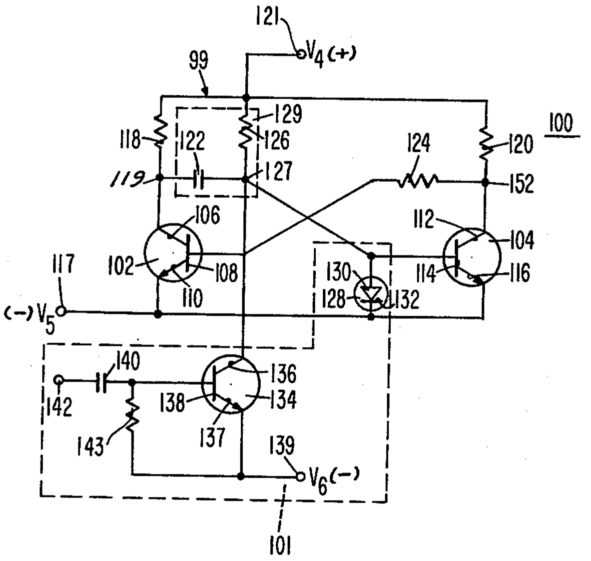
FIGURE 5 shows a signal synchronized monostable multivibrator in accordance with this invention.

FIG. 5 presents a signal synchronized monostable multivibrator 100 in accordance with this invention with conventional monostable multivibrator portion 99 and random signal synchronizing means 101. The conventional portion thereof includes transistor 102 having collector 106, base 108 and emitter 110, and transistor 104 having collector 112, base 114 and emitter 116. The collectors 106 and 112 are connected via resistors 118 and 120, respectively, to voltage source $V_4$ at terminal 121. Emitters 110 and 116 are connected to negative voltage source $V_5$ at terminal 117. The relationship of the voltage sources $V_4$ and $V_5$ are such that $V_4>V_5$ relative to a voltage datum. Collector 106 of transistor 102 is connetced via capacitor 122 to the base 114 of transistor 104; and collector 112 of transistor 104 is connected via resistor 124 to base 108 of transistor 102. Terminal 121 is connected via resistor 126 to base 114 of transistor 104. Capacitor 122 is connected to resistor 126 at junction 127 and forms therewith RC timing network 129 for transistor 104. The random signal synchronizing means 101 includes Zener diode 128 having its anode 130 connected to base 114 of transistor 104 and its cathode 132 connected to negative voltage source $V_5$ at terminal 117. It also includes transistor 134 having its collector 136 connected to base 114 of transistor 104 and its emitter 137 connected to negative voltage sourve $V_6$ at terminal 139. The relationships of the voltage sources relative to a voltage datum are $V_6<V_5<V_4$. The base 138 of transistor 134 is connected via capacitor 140 to random signal input terminal 142 and via resistor 143 to $V_6$.

Figure 6:
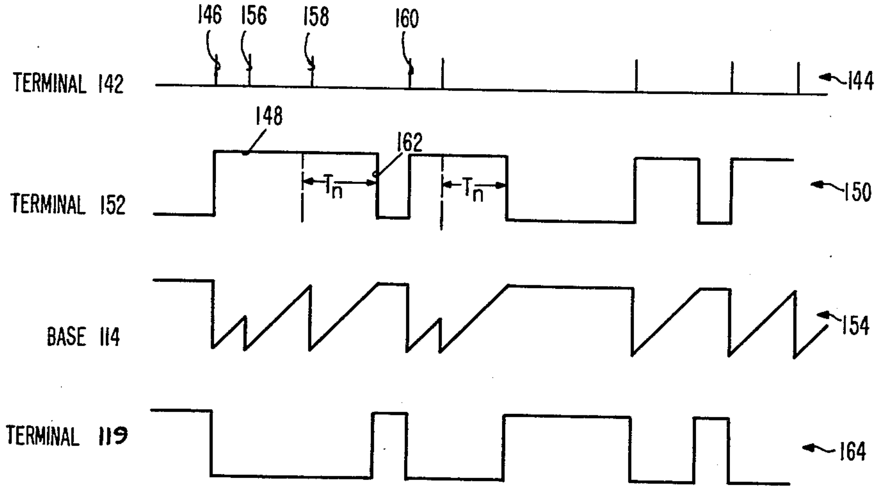
FIGURE 6 is a timing chart for the signal synchronized monostable multivibrator of FIG. 5 showing voltage levels at particular points therein during its operation with randomly spaced synchronizing signals.

The operation of the signal synchronized monostable multivibrator 100 of FIG. 5 will be understood through reference to the timing diagrams therefor presented in FIG. 6. Random synchronizing signals 144 are applied to input terminal 142. A synchronizing signal 146 causes transistor 134 to conduct and initiate the pulse 148 of pulse train 150 at terminal 152 of signal synchronized monostable multivibrator 100. Curve 154 represents the voltage on base 114 of transistor 104. So long as the next random signal 156 occurs within the natural pulse time interval $T_n$ of conventional monostable multivibrator portion 99, the pulse 148 continues in duration of another interval $T_n$. Since signal 160 occurs after an interval equal to $T_n$, the pulse 148 terminates with discontinuity 162. Curve 164 is the pulse train at terminal 119 of signal synchronized monostable multivibrator 100. It is a mirror image of pulse train 150.

The characteristic breakdown voltage of Zener diode 128 sets the down level of base 114 of transistor 104 thereby preventing transistor 134 from saturating and also provides a reference voltage for the RC timing network 129 consisting of capacitor 122 and resistor 126. The Zener diode 128 can be replaced by conventional circuitry which performs these functions.

The signal synchronized monostable multivibrator 100 may be considered to be a circuit which interrogates a signal train made up of signals whose relative time positions are a random function of time. Upon the occurrence of a signal, the signal synchronized monostable multivibrator 100 assumes a reference condition from which it begins to measure time. The circuit may be used to measure a time interval $T_n$ following a signal which is free from the presence of any of the other pulses making up the pulse train. The circuit generates a voltage discontinuity which is meaningful to a logic circuit receptive of the pulse train. If another random signal occurs within $T_n$, the natural time spacing of the circuit, the circuit resets on this new signal and interrogates the following time period of duration $T_n$. This continues until a discontinuity is generated. The circuit then resets on the next random signal and repeats the cycle.

With reference to FIG. 1, if a second signal synchronizing section be connected to junction 45 of RC timing network 47, the pulse train 74 from output terminal 44 can be synchronized both as to pulse width and pulse timing relative to a time datum.

It will be readily apparent to those skilled in the art of this invention that the structure of the embodiment presented in FIG. 5 is a special case of the structure of the embodiment presented in FIG. 1. If RC timing network 47 is removed from circuit 10 and resistor 124 (FIG. 5) inserted appropriately in its place by conventional switching technique, FIG. 1 would then present essentially the structure of FIG. 5. Therefore, by appropriately timing the switching of RC timing network 47 and resistor 124, the embodiment of FIG. 1 performs during successive time intervals as either a signal synchronized astable multivibrator or a signal synchronized monostable multivibrator. If the presence of RC timing network 47 be timed in relation to the synchronizing signals applied to terminal 70, the capabilities of both of the embodiments of this invention presented in FIGS. 1 and 5 can be obtained.

While the transistors described for the embodiments of this invention have been NPN type, PNP type transistors can be readily used through application of conventional electronic circuit technique.

This invention has considerable utility, illustratively, for timing and gating logic circuits in both analog and digital computers.

While the invention has been particularly shown and described with reference to preferred embodiments thereof, it will be understood by those skilled in the art that the foregoing and other changes in form and details may be made therein without departing from the spirit and scope of the invention.

What is claimed is:

A mono-stable multivibrator circuit having means for synchronizing the operation thereof with random input signals comprising:

first and second transistors of equal conductivity type each having base, emitter and collector electrodes;

a first voltage source for supplying collector voltage to said transistors;

first and second collector resistors respectively connecting the collectors of said first and second transistors to said first voltage source;

first and second base resistors, the first resistor connecting the base of the first transistor to the collector of the second transistor, and the second base resistor connecting the base of the second transistor to the first voltage source;

a capacitor connected between the collector of the first transistor and the base of the second transistor to form with said second base resistor an RC timing network for the second transistor;

a source of reference potential connected to the emitters of the first and second transistors;

a random signal synchronizing means including a third transistor having base, emitter and collector electrodes, resistance means electrically connecting the base and emitter electrodes of said third transistor, a voltage supply for biasing the emitter of said third transistor, capacitance input means for applying random synchronizing signals to the base of said third transistor, and means interconnecting the collector of the third transistor and the base of the second transistor whereby operation of the multivibrator circuit is under control of the synchronizing pulses; and a diode having anode and cathode electrodes, the anode of said diode being connected to the base of the second transistor and the cathode of said diode being connected to the emitter of the second transistor, said diode having a characteristic breakdown voltage operable to establish a maximum voltage differential between the base of said second transistor and the emitter of said second transistor, thereby preventing the third transistor from saturating and simultaneously providing a reference voltage for said RC network.

References Cited by the Examiner

UNITED STATES PATENTS

| | | | |
|---|---|---|---|
| 2,572,698 | 10/51 | Canfora | 331—51 |
| 2,739,238 | 3/56 | Bartelt | 328—196 |
| 3,005,963 | 10/61 | Emile | 331—113 |
| 3,018,387 | 1/62 | Beck | 307—88.5 |
| 3,024,417 | 3/62 | Secretan | 328—196 X |

OTHER REFERENCES

TM11–690, Basic Theory and Application of Transistors, March 17, 1959, pages 199–201, Published by U.S. Govt. Printing Office.

ROY LAKE, *Primary Examiner.*

ARTHUR GAUSS, JOHN KOMINSKI, *Examiners.*